Patented May 15, 1923.

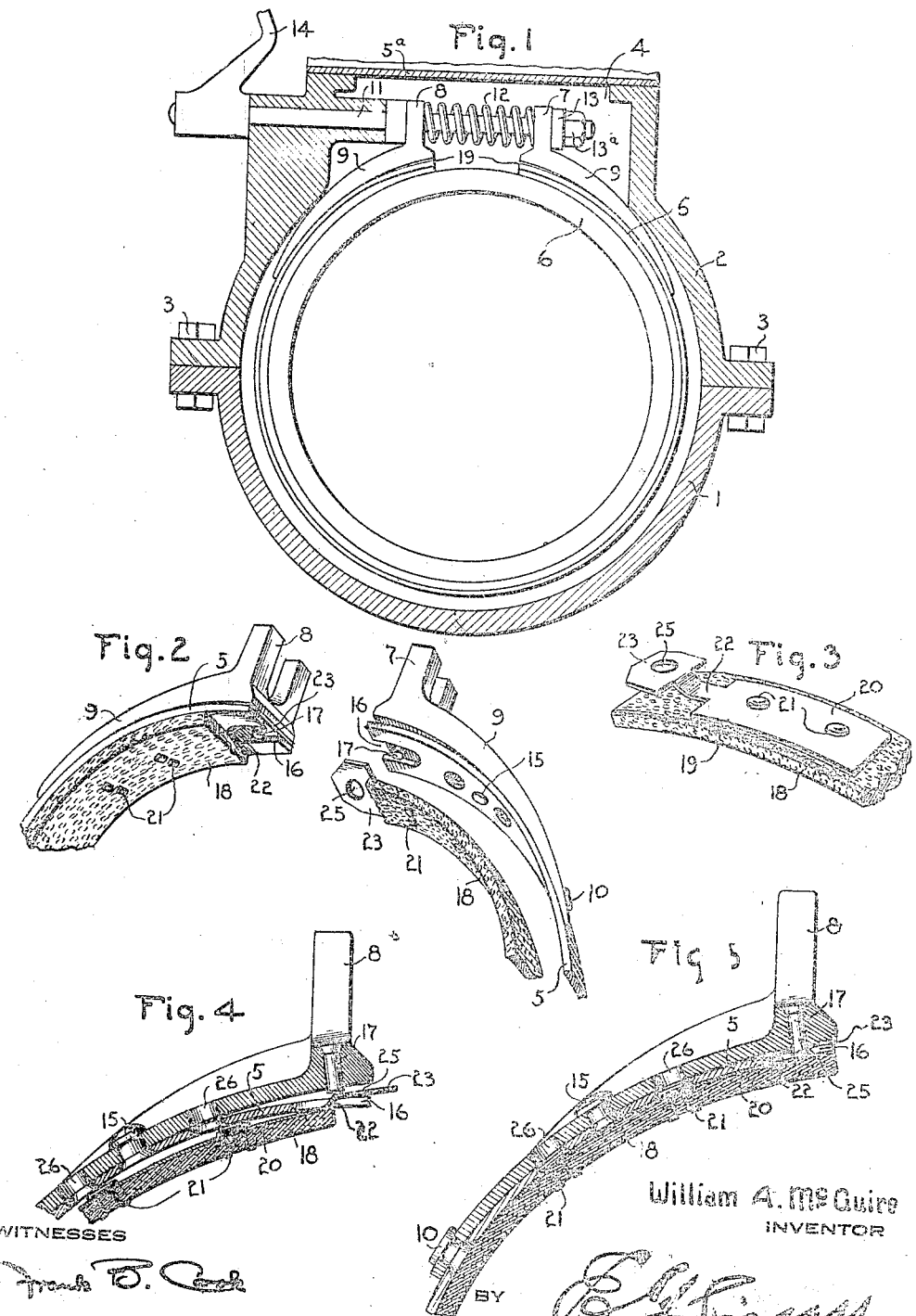

1,455,259

UNITED STATES PATENT OFFICE.

WILLIAM ALLAN McGUIRE, OF TURTLE CREEK, PENNSYLVANIA, ASSIGNOR TO McGUIRE BAND AND LINING MFG. CO., OF TURTLE CREEK, PENNSYLVANIA, A CORPORATION OF PENNSYLVANIA.

DETACHABLE BRAKE AND TRANSMISSION BAND LINING.

Application filed February 16, 1922. Serial No. 537,027.

*To all whom it may concern:*

Be it known that I, WILLIAM A. McGUIRE, a citizen of the United States, residing at Turtle Creek, in the county of Allegheny and State of Pennsylvania, have invented a new and useful Detachable Brake and Transmission Band Lining, of which the following is a specification.

This invention relates to detachable linings for brake and transmission bands of automobiles, and more particularly to the type of transmission mechanism found in certain well known machines.

An object of the invention is the provision of a simple and inexpensive lining for the transmission and brake bands, which may be readily attached to or detached from said bands without necessitating the removal of the bands from their usual position, or the removal of any portion of the transmission casing, and the consequent dismantling of any of the associated parts.

It is possible with this form of lining to apply it to the transmission or brake band through an opening in the top of the transmission casing, and which opening has a cover designed for removal, and which cover serves to expose to a limited extent the adjustable ends of the transmission and brake bands.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.

In the drawing:—

Fig. 1 is a transverse vertical section of a transmission casing showing my improved lining applied to one of the bands.

Fig. 2 is a view in perspective of the ends of the bands and my improved lining.

Fig. 3 is a view in perspective of one end of my improved lining.

Fig. 4 is a sectional view of one end of the band and the lining about to be locked in position.

Fig. 5 is a view of the band and lining as shown in Fig. 4, locked in position.

Referring to the drawing, a part of the transmission casing is shown in Fig. 1, having lower and upper sections 1 and 2, respectively, secured together by means of bolts 3, with a narrow opening 4 at the top of the upper half of the casing closed by a cover 5ª, designed for removal. The usual transmission or brake band 5 is shown encircling the transmission or brake ring 6, and is provided with forked ears 7 and 8, respectively, mounted upon the free ends of the band 5, and having a curved base portion 9 conforming to the curve of the ring and secured to the band 5 by means of rivets 10.

A shaft 11 is mounted in bearings in the crank casing and adapted to be seated in the forks of the ears 7 and 8. A coil spring 12 surrounding the shaft and engaging the forked ears 7 and 8 tends to maintain the ends of the brake or transmission bands apart. A nut 13 and a lock nut 13ª are mounted on the outer threaded end of the shaft 11 for adjusting the ears 7 and 8 towards or away from each other. A lever 14 on the outer end of the shaft 11 represents either the clutch, reverse or brake pedal of the usual construction.

A lining is usually mounted on the band 5 by means of split rivets passing through the lining and spaced perforations in the bands, the split ends of the rivets being bent back and forced into the fabric of the lining.

As described, the construction conforms to the usual one and does not disclose my invention.

My invention consists in a lining which may be readily attached to or detached from the bands 5 without removing the upper half 2 of the transmission casing, it being necessary only to remove the cover 5ª and the bolts 13 and 13ª. Nevertheless, when the lining is in position, it is locked securely upon the band 5 against accidental displacement.

The band 5 is secured to the base 9 of the forked lugs 7 and 8, by means of two rivets 10 and 15, so that the ends of the band 5 are free of the base member 9 for that portion which lies between the rivets 15 and the outer ends of the bands, so that it is possible by a tool like a screw driver, to readily pry the ends of the bands from the ends of the bases 9 of the forked lugs 7 and 8. The extremities of the band 5 are each provided with an open slot 16 into which is adapted to project a pin 17 depending from the base portions 9, adjacent the outer free ends thereof.

To secure the lining in position, I have provided clips 19 on the free ends thereof, whereby it may be detachably connected to the bands. Each clip comprises a base 20 secured to the ends of the lining 18 by means of split rivets 21, said base having a reduced neck 22, a portion of which is offset from the plane of the base of the clip, and which connects a head 23 to said base. The head is centrally perforated at 25. The pin 17 is adapted to be seated within the perforation 25 when the head of the clip is in position between the base 9 of the forked lugs 7 and 8 and the slotted ends of the band 5, as shown in Fig. 5.

The heads of the rivets 21 projecting beyond the outer surface of the base 20 of the clips 19 are adapted to be seated in perforations 26 formed in the band 5, when the clips are locked in position, so that the bases of the clips will lie in contact with the inner surface of the band 5.

When it is desired to replace my improved lining on any one of the bands 5, it will be only necessary to remove the cover 5ª and loosen the nuts 13 and 13ª, whereby the forked lugs 7 and 8 will be forced apart by the coil spring 12. A tool is applied between the detached slotted end of band 5 and the end of the base 9 of the forked lug 7, so as to force the end of the band from the detached end of said base 9, when the head 23 of the clip 19 may be pressed sufficiently away from the base 9 to free pin 17 from the perforation 25 in the head of the clip; after which the head of the clip may be removed from between the free end of the band 5 and the base 9. The other free end of the band 5 and the base of the forked lug 8, may be similarly pried away from each other to permit the removal of the confined clip and the complete withdrawal of the lining from the band, the latter remaining in position within the transmission casing.

A new lining is applied in the following manner:—The end of the lining which is to be held by the pin 17 is inserted between the end of the band 5 below the forked lug 8 and the ring 6, then carefully forced inwardly and outwardly until it re-appears beneath the base of the other forked lug 7. A screw driver is again applied between the sloted end of the band 5 and the base 9 of the lug 7, whereby the free end is forced away from the said base sufficiently to permit the head 23 of the clip to be inserted between the free end of the band and the base 9 of said lug, while permitting the pin 17 to slip into the perforation 25, the offset neck 22 riding within the open slot 16 on the free end of the band 5. When the screw driver is withdrawn, the slotted end of the band will return to its normal position and the head of the clip will be clamped between the slotted end of the band and the base of the attached forked lug 7.

As soon as the clip 19 is mounted in position adjacent the forked lug 7, the other clip 19 is inserted and locked in position between the slotted end of the band 5 and the base 9 of the lug 8, in a manner similar to the insertion and locking of the clip between the free end of the band 5 and the base 9 of the forked lug 7.

All three linings may be removed and replaced with facility and without necessitating the removal of any other parts of the transmission than the cover 5ª, the bolts 13 and 13ª being loosened to permit freedom in the operation.

What is claimed is:—

1. The combination with an outer brake or transmission band having on each end a base portion carrying a forked lug, said base portions being free of the ends of the band for a portion of their length, a detachable lining provided with means on its ends insertible between the free ends of the band and the base portions, and means on the base portions engageable with the means on the ends of the bands to prevent displacement of the lining from the bands.

2. The combination with an outer brake or transmission band having on each end a base portion carrying a forked lug, the ends of the bands being slotted and free from the base portions, a detachable lining having clips secured at its ends which are insertible between the slotted ends of the bands and the base portions and slidable in the slots of the bands, said clips being gripped by the slotted ends of the bands and the base portions for maintaining the clips in position.

3. The combination with an outer brake or transmission band provided with open slots at its ends, and having on each end a superposed base portion carrying a forked lug, the band being free from the base portions at each end, a pin mounted on each base portion and projecting inwardly through the open slots of the band, and a detachable lining having perforated clips secured at its ends, said clips adapted to be inserted between the slotted ends of the band and the base portions with the pins engaging the perforation in the clips, whereby the clips are locked in position between the slotted ends of the bands and the base portions.

4. The combination with an outer brake or transmission band provided with open slots at its ends, and having on each end a superposed base portion carrying a forked lug, the band being free from the base portions at each end, a pin mounted on each base portion and projecting inwardly through the open slots of the band, and a detachable lining provided with perforated clips at its ends, said clips comprising a base portion secured to the ends of the lining, an offset neck portion slidable through the open slots of the band, and a head adapted to be inserted between the slotted ends of the band and the base portions, said heads each having a perforation adapted to engage with a pin on each base portion whereby the clips are locked in position between the slotted ends of the band and the base portions.

5. A detachable lining for transmission or brake bands, provided with clips on its ends, said clips each comprising a base portion secured to the lining, a reduced neck projecting outwardly at an angle to the base portion, and a perforated head offset from the plane of the base of said clip, and connected to said base by the neck.

In testimony that I claim the foregoing as my own, I have hereto affixed my signature.

WILLIAM ALLAN McGUIRE.